United States Patent
Smith et al.

(10) Patent No.: US 9,545,353 B2
(45) Date of Patent: Jan. 17, 2017

(54) METHODS OF OPERATING AN EXOSKELETON FOR GAIT ASSISTANCE AND REHABILITATION

(75) Inventors: Jon Smith, Moffett Field, CA (US); Kern Bhugra, Moffett Field, CA (US)

(73) Assignee: Leonis Medical Corporation, Moffett Field, CA (US)

( * ) Notice: Subject to any disclaimer, the term of this patent is extended or adjusted under 35 U.S.C. 154(b) by 828 days.

(21) Appl. No.: 13/562,131

(22) Filed: Jul. 30, 2012

(65) Prior Publication Data

US 2013/0289452 A1 Oct. 31, 2013

Related U.S. Application Data

(60) Provisional application No. 61/513,507, filed on Jul. 29, 2011.

(51) Int. Cl.
*A61H 3/00* (2006.01)
*B25J 9/00* (2006.01)
(Continued)

(52) U.S. Cl.
CPC .............. *A61H 3/00* (2013.01); *A61H 1/0255* (2013.01); *A63B 21/0004* (2013.01);
(Continued)

(58) Field of Classification Search
CPC .... B25J 9/0006; B25J 9/104; A63B 21/00181; A63B 21/0004; A63B 21/0058; A63B 21/1419; A63B 21/1423; A63B 21/1449; A63B 21/1492; A63B 21/00178; A63B 23/03541; A63B 23/0405; A63B 2208/0204;A63B 2220/16; A63B 2220/40; A63B 2220/51; A63B 2220/72; A63B 2220/805; A63B 2220/836; A63B 2225/20; A63B 2225/50; A63B 2230/00; A63B 2230/06; A63B 2230/207; A61H 3/00; A61H 1/02; A61H 1/0255; A61H 2201/0184; A61H 2201/1445; A61H 2201/0107; A61H 2201/1215; A61H 2201/1238; A61H 2201/1628; A61H 2201/164; A61H 2201/165; A61H 2201/501; A61H 2201/5046; A61H 2201/5061; A61H 2201/5069; A61H 2201/5071; A61H 2201/5084; A61H 2201/5092; A61H 2201/5097; A61H 2230/00; A61H 2230/06; A61H 2230/207
See application file for complete search history.

(56) References Cited

U.S. PATENT DOCUMENTS

| | | | |
|---|---|---|---|
| 2004/0102723 A1* | 5/2004 | Horst | A61H 1/0237 601/5 |
| 2005/0166413 A1* | 8/2005 | Crampton | B25J 13/088 33/503 |

(Continued)

*Primary Examiner* — Quang D Thanh
(74) *Attorney, Agent, or Firm* — Perkins Coie LLP

(57) ABSTRACT

A method of operating an exoskeleton device includes: receiving sensor information; connecting a clutch system to a pulley system in; determining whether to engage a drive train gear to the clutch system based on the sensor information; engaging the drive train gear through the clutch system when determined to engage the drive train gear; and powering a first motor to drive the drive train gear for controlling a joint or segment of exoskeleton device.

12 Claims, 13 Drawing Sheets

(51) Int. Cl.
　　　B25J 9/10　　　　(2006.01)
　　　A63B 71/06　　　(2006.01)
　　　A61H 1/02　　　　(2006.01)
　　　A63B 21/00　　　(2006.01)
　　　A63B 21/005　　　(2006.01)
　　　A63B 23/035　　　(2006.01)
　　　A63B 23/04　　　(2006.01)
(52) U.S. Cl.
　　　CPC .... *A63B 21/0058* (2013.01); *A63B 21/00178* (2013.01); *A63B 21/00181* (2013.01); *A63B 21/4009* (2015.10); *A63B 21/4011* (2015.10); *A63B 21/4025* (2015.10); *A63B 21/4047* (2015.10); *A63B 23/03541* (2013.01); *A63B 23/0405* (2013.01); *A63B 71/0622* (2013.01); *B25J 9/0006* (2013.01); *B25J 9/104* (2013.01); *A61H 2201/0107* (2013.01); *A61H 2201/0184* (2013.01); *A61H 2201/1215* (2013.01); *A61H 2201/1238* (2013.01); *A61H 2201/1445* (2013.01); *A61H 2201/164* (2013.01); *A61H 2201/165* (2013.01); *A61H 2201/1628* (2013.01); *A61H 2201/501* (2013.01); *A61H 2201/5046* (2013.01); *A61H 2201/5061* (2013.01); *A61H 2201/5069* (2013.01); *A61H 2201/5071* (2013.01); *A61H 2201/5082* (2013.01); *A61H 2201/5084* (2013.01); *A61H 2201/5092* (2013.01); *A61H 2201/5097* (2013.01); *A61H 2230/00* (2013.01); *A61H 2230/06* (2013.01); *A61H 2230/207* (2013.01); *A63B 2208/0204* (2013.01); *A63B 2220/16* (2013.01); *A63B 2220/40* (2013.01); *A63B 2220/51* (2013.01); *A63B 2220/72* (2013.01); *A63B 2220/805* (2013.01); *A63B 2220/836* (2013.01); *A63B 2225/20* (2013.01); *A63B 2225/50* (2013.01); *A63B 2230/00* (2013.01); *A63B 2230/06* (2013.01); *A63B 2230/207* (2013.01)

(56)　　　　　　　References Cited

U.S. PATENT DOCUMENTS

2009/0264799 A1\*　10/2009　Bonutti ................ A61H 1/0237
　　　　　　　　　　　　　　　　　　　　　　　601/5
2010/0038983 A1\*　2/2010　Bhugra .................... A61F 2/68
　　　　　　　　　　　　　　　　　　　　　　　310/83

\* cited by examiner

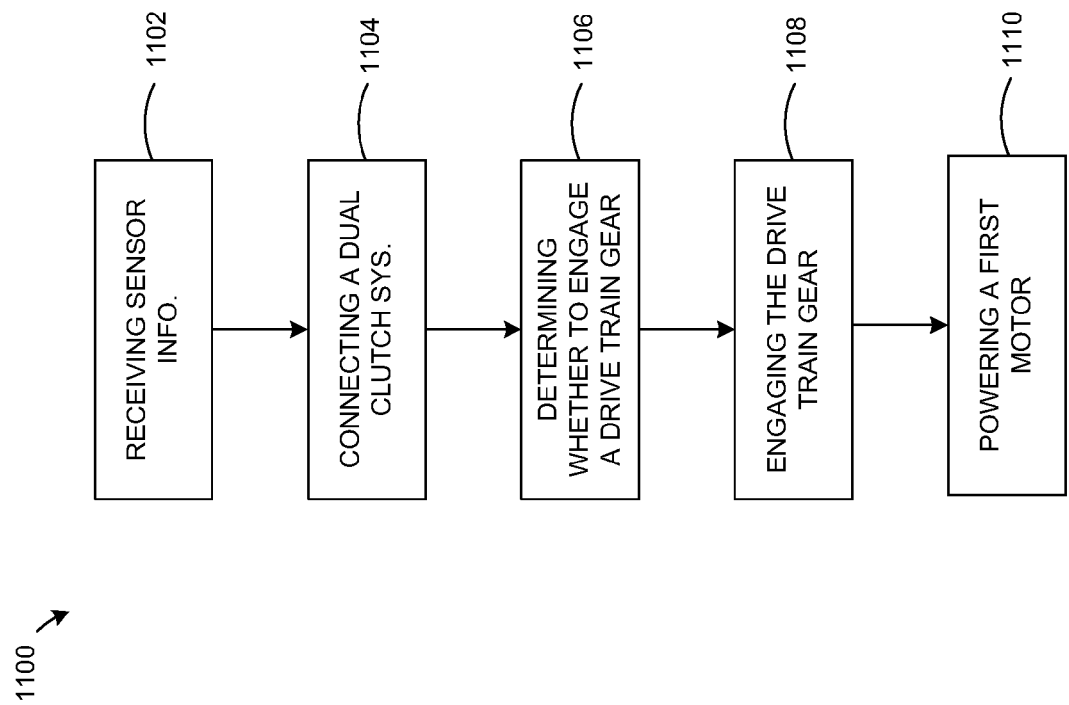

METHODS OF OPERATING AN EXOSKELETON FOR GAIT ASSISTANCE AND REHABILITATION

CROSS REFERENCE TO RELATED APPLICATION

This application claims the benefit of U.S. Provisional Patent Application Ser. No. 61/513,507 filed Jul. 29, 2011, and the subject matter thereof is incorporated herein by reference thereto.

FIELD OF INVENTION

This invention relates generally to an exoskeleton device, and in particular to an exoskeleton device with an actuation system.

BACKGROUND

Physical therapy is a much needed remedy for those patients who suffer great injuries. However, the effects of clinical sessions are gradual and may not help with day-to-day activities. Wearable physical therapy device may be used as to complement these clinical sessions. However, these wearable devices face many challenges.

Existing wearable physical therapy devices can be inflexible. The existing wearable physical therapy devices are not very customizable and lack personalization. Hence, the existing devices cannot be used as a general solution across a variety of patients and injuries. The existing wearable physical therapy devices are generally passive, and cannot react to special situations.

Thus, a need remains for an effective device and system to facilitate physical recovery. In view of the ever-increasing medical needs, along with growing competitive pressure in the manufacture of the medical devices for rehabilitation, it is now essential that the problems described be solved. Solutions to these problems have been long sought but prior developments have not taught or suggested any solutions. Accordingly, viable solutions to these problems have eluded those skilled in the art.

DISCLOSURE OF INVENTION

The present invention provides a method of operating an exoskeleton device including: receiving sensor information; connecting a clutch system to a pulley system in; determining whether to engage a drive train gear to the clutch system based on the sensor information; engaging the drive train gear through the clutch system when determined to engage the drive train gear; and powering a first motor to drive the drive train gear for controlling a joint or segment of the exoskeleton device. The exoskeleton device can provide gait assistance, rehabilitation of the user, or physical augmentation of the user's abilities.

In one embodiment, the invention provides an exoskeleton device for gait assistance and rehabilitation comprising: a skeleton joint system for providing support and structure to the exoskeleton device; a textile over the skeleton joint system; a detachable actuation system; a pulley system configured to be engaged to the detachable actuation system; and a sensor system attached to the skeleton joint system.

A further embodiment of the invention includes an actuator system for an exoskeleton device comprising: a closed loop cable system attached to points on the exoskeleton device; a pulley system connected to the closed loop cable system; a detachable motor and gear system; and a drive shaft for engaging or disengaging the detachable motor and gear system to the pulley system.

Some embodiments of the invention have other aspects, elements, features, and steps in addition to or in place of what is described above. These potential additions and replacements are described throughout the rest of the specification

BRIEF DESCRIPTION OF THE DRAWINGS

FIG. 11 is a flow chart of a method of operating an exoskeleton system, such as the exoskeleton system of FIG. 1, in a further embodiment of the present invention.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

The present invention includes an exoskeleton for gait assistance. The exoskeleton can have a passive locking system at joints of the exoskeleton for gait assistance, including providing mobile and stationary stability. The passive locking system at the joints can be implemented by a clutch system, such as a pawl clutch system.

The exoskeleton can also be motorized by an actuation system. The exoskeleton can include a sensor system for providing bio-mechanical feedback information to a control system. For example, the sensor system can determine if the user of the exoskeleton is standing up, sitting down, walking, running, climbing a hill, falling, unstable, stable, or any combination thereof. The sensor system can accomplish this by utilizing force sensors, inertia measurement units, potentiometer, gyro, accelerometer, current sensors, temperature sensors, biofeedback sensors, or any combination thereof. At a first setting of the control system, the actuation system can allow the user to walk, run, jump, or move freely and provide gait assistance to the user's movement pattern. At a second setting of the control system, the actuation system can prevent users from making movements that may hurt or damage the users, such as falling or running. Other settings of the control system will allow the user or an operator, such as a clinic doctor, to balance between freedom of movement and preventive or rehabilitative movement correction.

Figure 1:
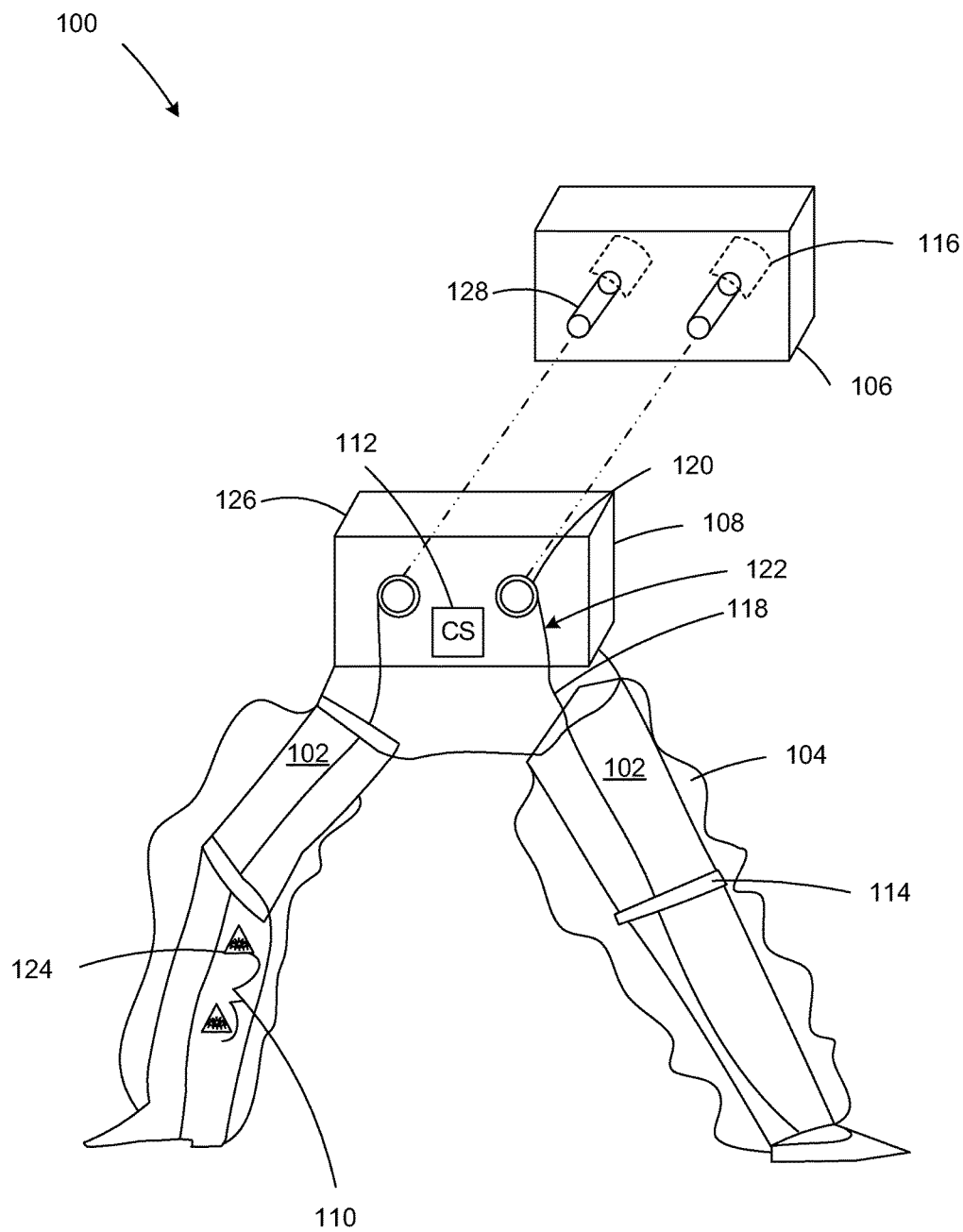
FIG. 1 is a perspective plan view of an exoskeleton system, in accordance with an embodiment of the invention.

Referring now to FIG. 1, therein is shown an perspective plan view of an exoskeleton system 100, in accordance with an embodiment of the invention. Some of the structures are shown to be transparent to better illustrate components within the exoskeleton system 100.

The exoskeleton system 100 includes an exoskeleton device for gait assistance. The exoskeleton system 100 can be worn by a human. The exoskeleton system 100 can be a bilateral knee ankle hip orthotic system. The exoskeleton system 100 can also be a full-body exoskeleton system. The exoskeleton system 100 includes at least a skeleton joint system 102 (illustrated, for example, to include the structure of both leg skeletons and their joints in FIG. 1). The exoskeleton system 100 can include a textile 104, an actuation system 106, a pulley system 108, a sensor system 110, a control system 112, or any combination thereof.

For illustrative purposes, the skeleton joint system 102, the actuation system 106, the pulley system 108, the sensor system 110, and the control system 112 are shown to be visible in the illustration. However, it is understood that these system may be covered by each other or other components of the exoskeleton system 100 such as the textile 104.

The skeleton joint system 102 is defined as a mechanical support structure external to a body, such as a human body. The skeleton joint system 102 includes joints 114. Each of the joints 114 is a location at which two or more segments of the skeleton joint system 102 make contact and rotate or slide in relation to one another. For example, the joints 114 can be hinges, pivots, bearings, slides, or any combination thereof.

The exoskeleton system 100 can include the textile 104 for assisting a person to wear the exoskeleton system 100. The textile 104 is defined as a material, which may be flexible, around the skeleton joint system 102. For example, the textile 104 can be a woven material, such as cloth. For another example, the textile 104 can be leather, nylon, spandex, polyester, carbon fiber, plastic, or any combination thereof. The textile 104 can be attached to the skeleton joint system 102 with nails, glue, pins, clamps, hook and loop, bonding, encasement, other means of attachment, or any combination thereof.

The exoskeleton system 100 can include the actuation system 106 for actuating the skeleton joint system 102. The actuation system 106 is defined as a motor control system. The actuation system 106 can include one or more of an actuator 116 (within the actuation system 106 and shown as dotted lines). The actuator 116 is defined as a type of motor for moving or controlling a mechanism or system. The actuation system 106 can be powered by a battery, a green energy source, an electric source, a hydraulic or pneumatic pressure system, or any combination thereof.

The exoskeleton system 100 can include the pulley system 108 to facilitate movements of the joints 114 on the skeleton joint system 102. The pulley system 108 is defined as a system that uses one or more pulleys to lift or move a load through the use of one or more of a cable 118 to transmit tension force around the one or more pulleys. The pulley system 108 can be detachable from the actuation system 106 or be integrated with the actuation system 106. The pulley system 108 can include at least a pulley 120. The pulley system 108 can be coupled to a cable system 122. The pulley system 108 can be modularly detachable from the cable system 122 or be integrated with the cable system 122.

The cable system 122 includes at least the cable 118. The cable 118 is defined as a single continuous flexible object. For example, the cable 118 can be a rope, a wire, a nylon line, a leather belt, a chain, other flexible continuous object, or any combination thereof. The pulley 120 is defined as a wheel on an axle that is designed to support movement of a cable or belt along its circumference. For example, the pulley 120 can be made of wood, metal, plastic, ceramic, alloy, or any combination thereof.

The sensor system 110 is a system for providing feedback information about the user of the exoskeleton system 100, the environment, the exoskeleton system 100, or any combination thereof. The feedback information can be displayed via a user interface to an operator or can be used as part of gait assistance and correction mechanism calculated by the exoskeleton system 100. The sensor system 110 can include sensors 124. The sensors 124 can be embedded within the joints 114, the textile 104, or a combination thereof to provide feedback to the control system 112. Each of the sensors 124 is an electronic device that measures a physical quantity and converts it into a signal which can be read by an observer or instrument. For example, the physical quality can include mechanical, electrical, or biological qualities. The exoskeleton system 100 can have the sensors 124 within the joints 114 for determination of joint angle. The exoskeleton system 100 can also have the sensors 124 for detecting pressure within the textile 104 to determine tension for force application to the user of the system for the purpose of comfort. The sensors 124 can also determine biomechanical feedback information for the control system 112. The sensors 124 can include accelerometers, force sensitive resistors, potentiometers, inertial measurement units, gyrometers, biological sensors, other electronic sensors of force, movement, weight, acceleration, direction, location, angle, or muscle activation, or any combination thereof. The sensors 124 can determine acceleration and relative rotation of the limb during gait or other exercises.

The exoskeleton system 100 can include the control system 112 for gait assistance and rehabilitation of patients. The control system 112 can reside in a backpack with the actuation system 106 or in a different pack with the pulley system 108 or altogether separate from both the actuation system 106 or the pulley system 108. For illustration purposes, the control system 112 is shown to reside together with the pulley system 108. The control system 112 is for determining when and how the actuation system 106 is activated and powered. The control system 112 can determine how much power to supply to the actuation system 106, when to supply the power, frequency and pattern of the power, or any combination thereof. The control system 112 can include one or more processors and memories to perform methods of gait assistance. The control system 112 can determine when and how much to power each of the actuator 116 in the actuation system 106 to stabilize, support, or assist the wearer of the exoskeleton system 100. The control system 112 can also analyze the movement of the wearer to correct for gait pattern or provide support with existing gait pattern. The control system 112 can also analyze other biological measurements of the user such as heart rate, oxygenation, or others.

This embodiment uses the pulley system 108 to actuate the joints 114 from a back station 126 located on the lower back. The exoskeleton system 100 includes the actuation system 106 that is removable. The pulley system 108 is oriented flat on the back such that a drive shaft 128 from the actuation system 106 can be engaged and disengaged. Dotted lines are shown to illustrate how the drive shaft 128 can fit into the pulley system 108. In this manner, the actuation system 106 can be modularly attached or detached.

The exoskeleton system 100 is designed as both a passive recovery device and an active recovery device. It has been discovered that an exoskeleton that can act as both a passive recovery device and an active recovery device has many business advantages, including upgradeability. The passive recovery device can have mechanical joint locking and support structures that can stabilize the wearer of the exoskeleton system 100 and limit body tissue damaging movements.

An upgradeable device such as the exoskeleton system 100 allows the user to upgrade the exoskeleton from a passive device to an active device easily by engaging or disengaging the back station 126 or the actuation system 106. The modularity allows for different opportunities, including creating new business methods not previously available.

The exoskeleton system 100 is also designed to be modularly customizable. Without the actuation system 106, the rest of the exoskeleton system 100 can be individually customized for a patient or a wearer of the exoskeleton system 100.

Figure 2:
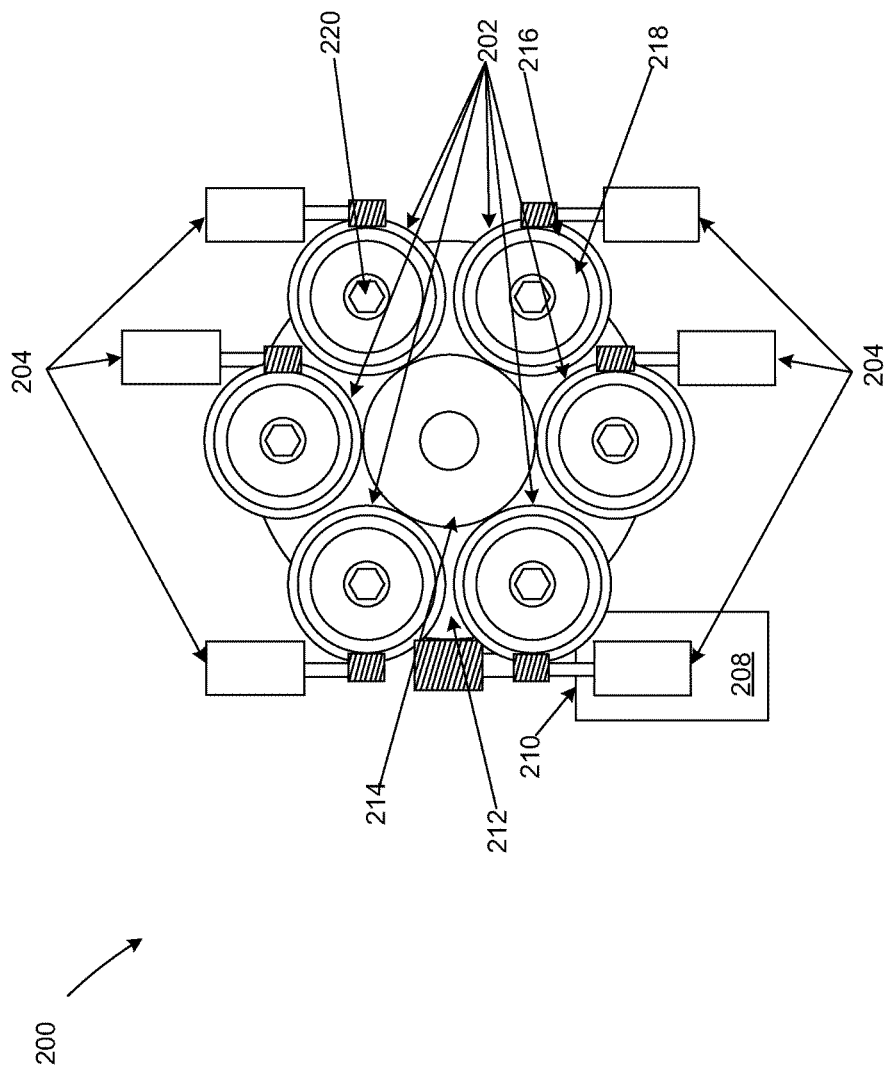
FIG. 2 is an example illustration of an actuation system.

Referring now to FIG. 2, therein is shown an example illustration of an actuation system 200. The actuation system 200 is defined as a motor control system. For example, the actuation system 200 can be the actuation system 106 of FIG. 1.

The current embodiment of the actuation system 200 can have drive train systems 202 with individual motors 204 arranged on a central circumference. The individual motors 204 and the drive train systems 202 are designed for controlling each joint or segment of a robotics system. A main drive motor 208 is located on a main drive train 210 which powers a main worm gear 212 and a central gear 214. The central gear 214 or the main worm gear 212 can then couple into the drive train systems 202 of each joint. The individual motors 204 are arranged in a manner which turns individual worm gears 216. The individual worm gears 216 can be connected via a clutch system 218 which allows a shared main drive motor system by the main drive motor 208 to assist or independently actuate one or more of pulley drive shafts 220. The clutch system 218 can be a dual clutch system.

The current embodiment of the clutch system 218 can use servo actuated pawls to engage and disengage either of the drive trains such that a drive shaft of the actuation system 200 is connected to the main drive motor 208, the individual motors 204, both the main drive motor 208 and the individual motors 204, or neither. For example, the drive shaft can be the drive shaft 128 of FIG. 1. When the clutches are fully disengaged, the exoskeleton is in free swing. The clutch system 218 can include pawl clutches. The clutch system 218 can be directional and can be selectively engaged in either the clockwise or counterclockwise direction. When both are engaged, the actuation system 200 has positive control over the exoskeleton to control both extension and flexion of the specific joint and act as a stance control system.

The benefits of this embodiment allow fully independent operation of the joints 114 using the individual motors 204 or using the added assistance or independent operation of the main drive motor 208 to drive the joints 114. The benefits of using a pawl based clutch system include that the system can selectively be used to assist and allow the user to outrun the assistance without interfering with patient intent. The pawl system can additionally be used to positively control the leg in both directions by engaging both counter clockwise and clockwise pawl systems. The benefits of using the worm gear system as a gear reduction solution are beneficial as most worm gears have a non-backdriving feature. This allows the use of the device as a stance control brace without wasting energy or driving motors simply by having both counter clockwise and clockwise pawl systems engaged and leaving the motors stopped.

Other embodiments of the invention use alternate gearing elements in the drivetrain to change the gearing such as planetary gear, sun gear, combination spur gear, other types of worm gear, other simple combinations of gears to manipulate toque of the motors to the prescribed level, or any combination thereof. Other embodiments could implement alternate one way clutch designs such as friction clutches, or selective needle bearing clutches.

Figure 3:
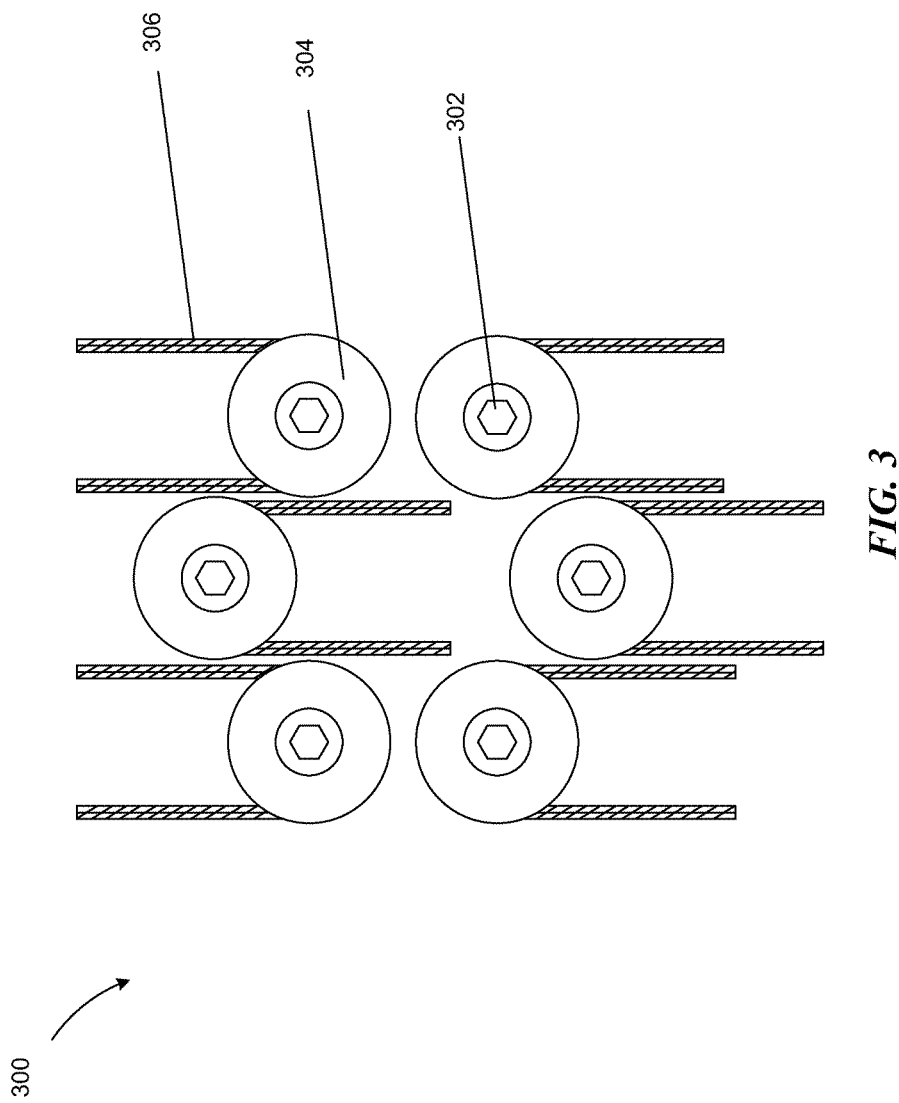
FIG. 3 is an example illustration of a pulley system.

Referring now to FIG. 3, therein is shown an example illustration of a pulley system 300. The pulley system 300 is a system that uses one or more pulleys to lift or move a load through the use of one or more cables to transmit tension force around the one or more pulleys. For example, the pulley system 300 can be the pulley system 108 of FIG. 1.

The pulley system 300 can be actuated by an actuation system, such as the actuation system 106 of FIG. 1 or the actuation system 200 of FIG. 2. The pulley drive shafts 220 can connect to or disconnect from pulley shafts 302 to allow the motor system to turn pulleys 304 to actuate a cable system 306.

Figure 4A:
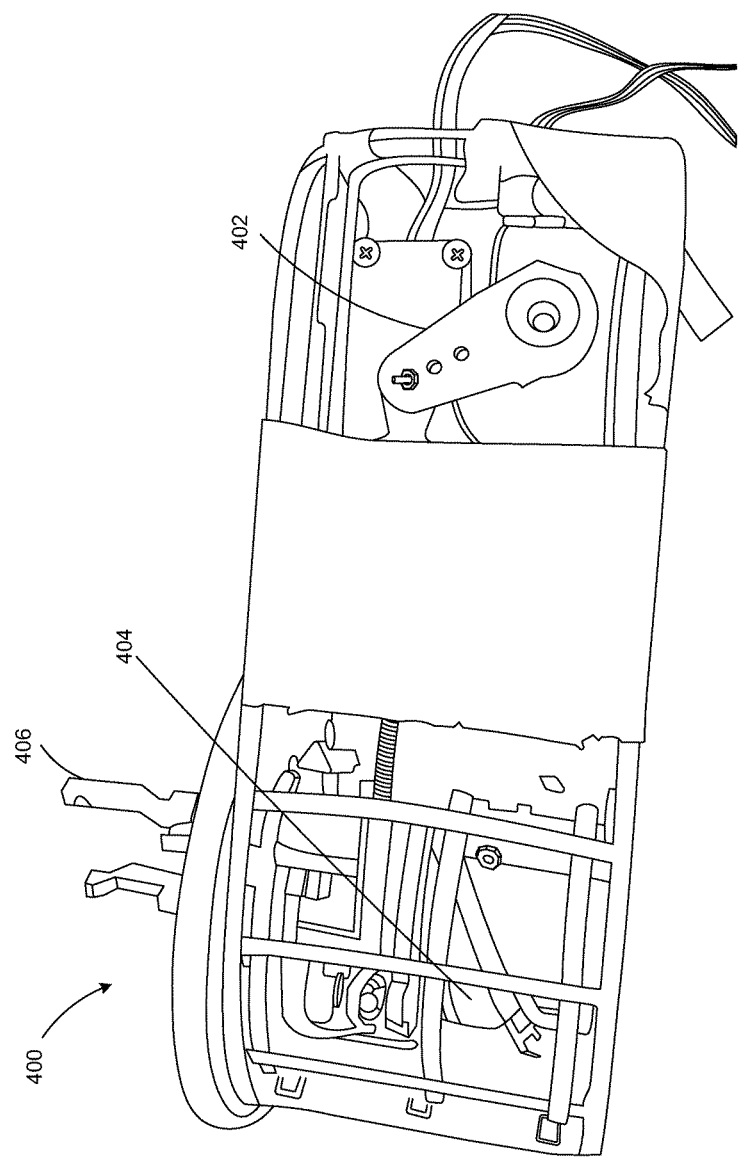
FIG. 4 is an example illustration of a clutch system.
Figure 4B:
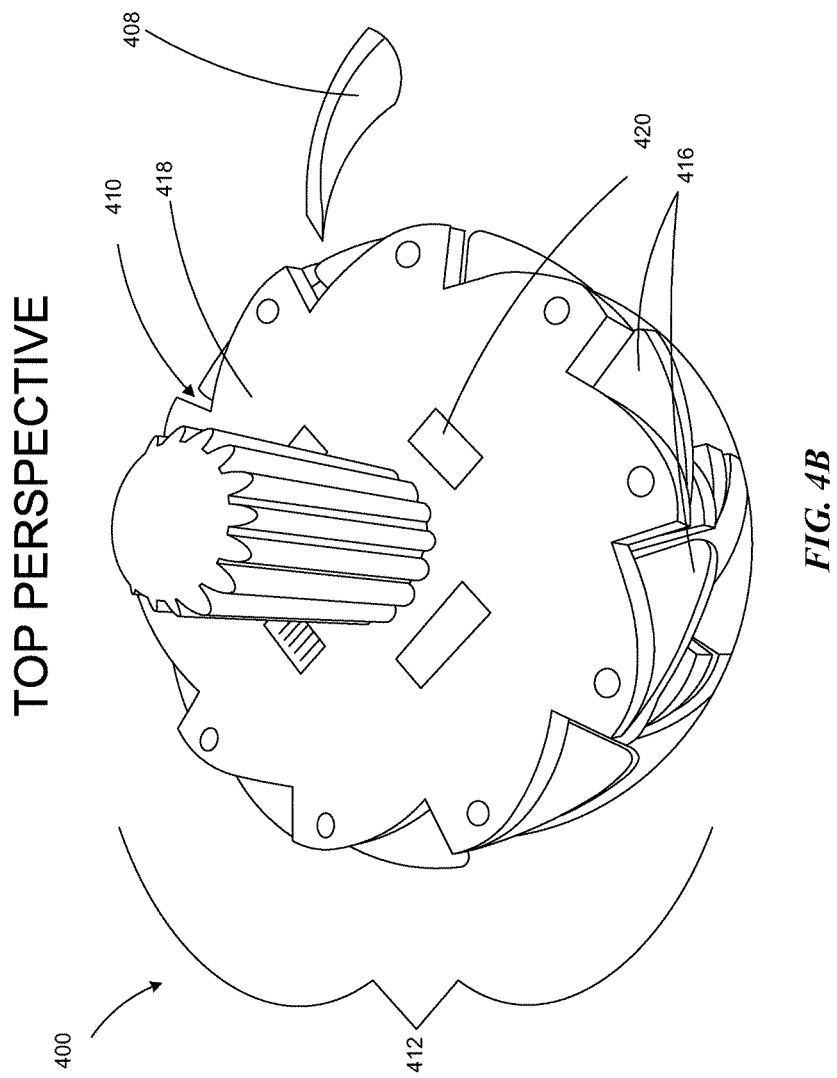
Figure 4C:
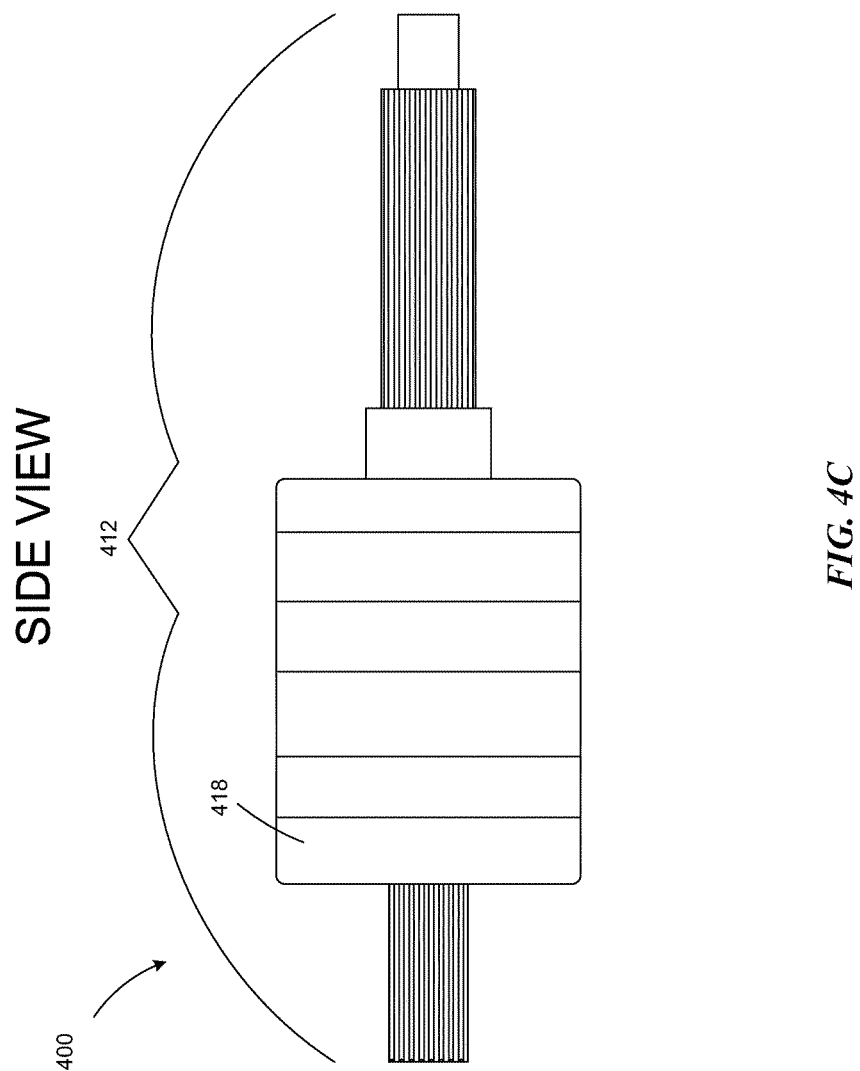

Referring now to FIG. 4, therein is shown an example illustration of a clutch system 400. FIG. 4 includes three different illustrations of the clutch system 400. FIG. 4A illustrates a clutch control portion of the clutch system 400. Particularly, FIG. 4A illustrates how one or more of servos 402 can engage or disengage a clutch portion of the clutch system 400. FIG. 4B illustrates a perspective top view of the clutch portion of the clutch system 400. FIG. 4C illustrates a side view of the clutch portion of the clutch system 400.

A clutch system 400 can employ a method of actuation which is driven by the servos 402. The servos 402 can actuate a platform, such as ramped rings 404, around a base which move vertically to control swing arms, such as a clutch keys 406, which either allow pawls 408 to engage, or close a pawl engagement opening 410 to disengage a clutch 412. The pawls 408 are attached to the rest of the actuation system or pulley system (not shown). The clutch keys 406 are defined as mechanical arm-like structures for triggering the pawls 408 to spring out or retract. In another embodiment, the servos 402 can actuate a pulley cable which moves the platform up and down to control the extension and retraction of the clutch keys 406.

The clutch system 400 can be a non contact pawl clutch system with bi-stable spring mechanism. The clutch system 400 can included a system of activation by the use of bi-stable spring systems. A bi-stable spring system has two low energy points which are stable positions. The clutch system 400 can allow the pawls 408 of the clutch 412 to stay disengaged from internal gears without incurring friction when the clutch system 400 is rotating in either direction. This leads to higher efficiency rotation without incurring drag. The clutch system 400 can use an actuation system which pushes or pulls the pawls 408 from one state to the other. When a first set of the pawls 408 are engaged, the pawls 408 ratchet in one direction and provide force in the other. A second set of the pawls 408 is independently actuated and provides force in the opposite direction to the first set of pawls. Kickers 416 are actuated by the clutch keys 406 to open or close some or all of the pawl engagement opening 410. The pawls 408 are spring-loaded to engage into the pawl engagement opening 410. When the pawl engagement opening 410 is closed by the kickers 416, the kickers 416 would prevent one or more of the pawls 408 from engaging with the clutch 412.

The use of the clutch keys 406, such as ramped linear pins, can turn the clutch 412 on or off depending on which state each of the clutch keys 406 is in. The ratcheting pawl clutches are turned on and off by the clutch keys 406, which are actuated in an axis parallel to the axis of the rotation of a pawl clutch 418. The clutch keys 406 can rotate with the axle body and pawl pockets 420. The clutch keys 406 can be actuated by the servos 402 which lift and lower a platform, such as the ramped rings 404. For example, the platform can be actuated by a cable coupled to the servos 402. The clutch keys 406 can rotate freely with the axle during the operation of the servos 402. The pawls 408 and outer structure of the clutch 412 are rotated directly by a worm wheel or indirectly by chain, belt, or cable system.

In one embodiment, the clutch system 400 can be integrated directly into the joints of the exoskeleton—a dual directional ratcheting clutch mechanism designed into each joint. The advantages of this system include reduced friction in free-swing modes and reduced compliance of force application to the joint. The exoskeleton system becomes essentially a stance control brace without active force application, but with controlled free swing in both directions and the ability to fully lock in a given position.

Figure 5:
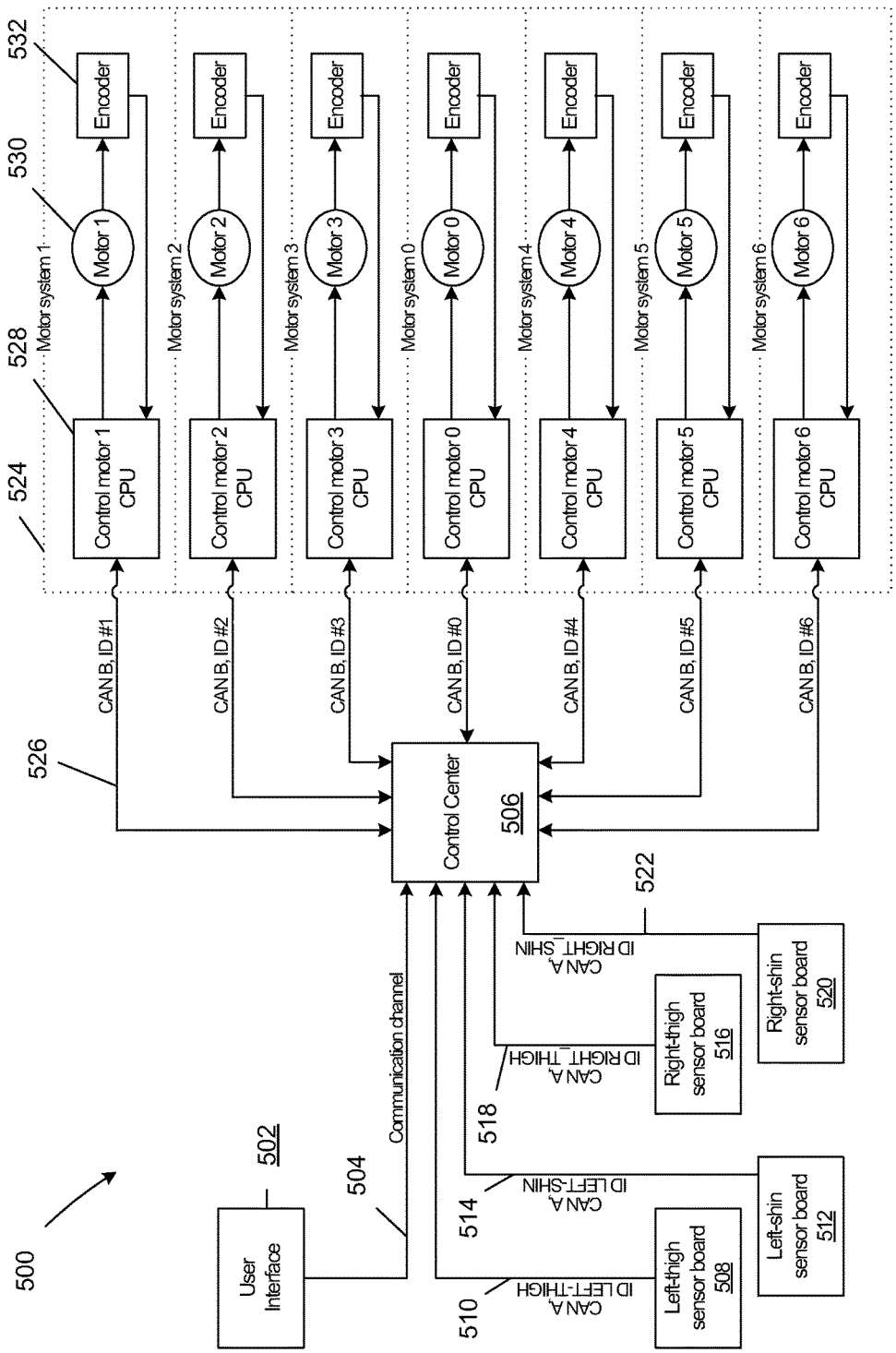
FIG. 5 is an example of a system hardware diagram of a control system.

Referring now to FIG. 5, therein is shown an example of a system hardware diagram of a control system 500. The control system 500 is for determining when or how an actuation system is activated and powered. The control system 500 can determine how much power to supply to the actuation system, when to supply the power, frequency and pattern of the power, or any combination thereof. For example, the control system 500 can be the control system 112 of FIG. 1.

The control system 500 can include one or more methods of controlling motors in an actuation system, such as the actuation system 106 of FIG. 1. The one or more methods can be implemented by components, storages, and modules described below. The components and modules can be implemented as hardware modules, software modules, or any combination thereof. For example, the modules described can be software modules implemented as instructions on a non-transitory memory capable of being executed by a processor or a controller on a machine.

The control system 500 can include additional, fewer, or different modules for various applications. Conventional components such as memory, communication, interfaces, user interfaces, network interfaces, security functions, load balancers, failover servers, management and network operations consoles, and the like are not shown so as to not obscure the details of the system.

The control system 500 can include an user interface 502 for making adjustments with the control system 500. The user interface 502 is a device or module capable of receiving user inputs. For example, the user interface 502 can be a tablet, a personal computer, a laptop, a cell phone, an e-reader, a mouse, a keyboard, a touch-screen, a microphone, an application programming interface, a software interface, a camera, or any combination thereof.

The user interface 502 can communicate through a communication channel 504 with a control center 506. For example, the communication channel 504 can be an Ethernet or other wire-based network or a wireless NIC (WNIC) or wireless adapter for communicating with a wireless network, such as a WI-FI network. The communication channel 504 can be any suitable network for any suitable communication interface. As an example and not by way of limitation, the communication channel 504 can be an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As another example, the communication channel 504 can be a wireless PAN (WPAN) (such as, for example, a BLUETOOTH WPAN), a WI-FI network, a WI-MAX network, a 3G or 4G network, a cellular telephone network (such as, for example, a Global System for Mobile Communications (GSM) network).

In one embodiment, the communication channel 504 uses standard communications technologies and/or protocols. Thus, the communication channel 504 can include links using technologies such as Ethernet, 802.11, worldwide interoperability for microwave access (WiMAX), 3G, 4G, CDMA, digital subscriber line (DSL), etc. Similarly, the networking protocols used on the communication channel 504 can include multiprotocol label switching (MPLS), the transmission control protocol/Internet protocol (TCP/IP), the User Datagram Protocol (UDP), the hypertext transport protocol (HTTP), the simple mail transfer protocol (SMTP), and the file transfer protocol (FTP). The data exchanged over the communication channel 504 can be represented using technologies and/or formats including the hypertext markup language (HTML) and the extensible markup language (XML). In addition, all or some of links can be encrypted using conventional encryption technologies such as secure sockets layer (SSL), transport layer security (TLS), and Internet Protocol security (IPsec).

The control center 506 is a computer processor, such as a central processing unit (CPU). For example, the control center 506 can be a multiple input and/or multiple output computing device, such as the Delfino TMS320C28346 CPU.

The control center 506 can receive sensor information through controller area network (CAN) buses. For example, the control center 506 can receive sensor information from a left-thigh sensor board 508 through a left-thigh CAN 510, a left-shin sensor board 512 through a left-shin CAN 514, a right-thigh sensor board 516 through a right-thigh CAN 518, and a right-shin sensor board 520 through a right-shin CAN 522. The CANs 510, 514, 518, and 522 are controller area network buses. The left-thigh sensor board 508, the right-thigh sensor board 516, the left-shin sensor board 512, and the right-shin sensor board 520 are examples of a sensor board. The sensor board is defined as a control device for processing information from sensors. Each of the sensor boards can be the sensor board as described in FIG. 8. The sensor boards can convert the signals received from each of sensors into analog or digital information understandable by the control center 506. The sensor boards can also normalize the sensor signals before passing it on to the control center 506.

The control center 506 can be in communication with a motor system 524 through motor CANs 526. The control center 506 can send commands to request particular operations of the motor systems 524 to support patients during therapy sessions. The motor system 524 can include one or more of a motor controller 528, each of them in communication with the control center 506 through one of the motor CANs 526. The motor controller 528 is a processing unit for controlling a motor. For example, the motor controller 528 can be a CPU, such as the Piccolo TMS320F28034.

The motor system 524 can also include a motor 530 and an encoder 532. The motor 530 can receive instructions directly from the motor controller 528, such as pattern and schedule of applying power to the motor 530. The motor controller 528 can also control the details of movement of the motor 530, such as acceleration, direction, velocity, temperature, or any combination thereof.

The motor 530 can provide information for the encoder 532. The encoder 532 is defined as a transducer. The encoder 532 can sense a position or an orientation of the motor 530 for reference or active feedback control. The encoder 532 can detect positional or orientation information from the motor 530 back to the motor controller 528 to provide the motor controller 528 with feedback information.

Figure 6:
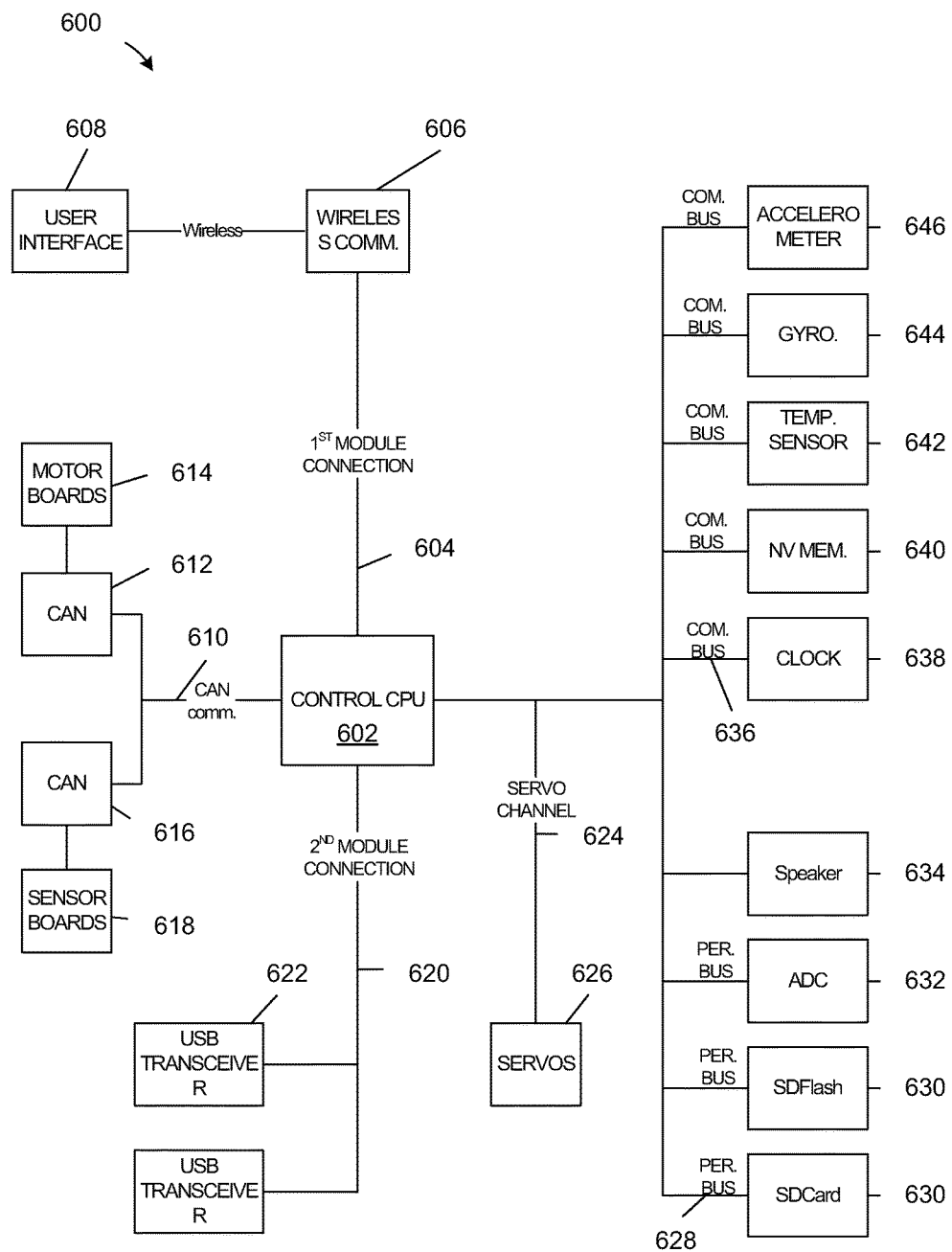
FIG. 6 is an example of a block diagram of a main board.

Referring now to FIG. 6, therein is shown an example of a block diagram of a main board 600. For example, the main board 600 can be part of the control system 500 of FIG. 5. The main board 600 can include a control CPU 602. For example, the control CPU 602 can be the control center 506 of FIG. 5. The control CPU 602 can be connected to communication modules via different kind of buses. For example, the control CPU 602 can be connected through a first module connection 604 to a wireless communication module 606. The first module connection 604 can be, for example, an universal asynchronous receiver/transmitter, a piece of computer hardware that translates data between parallel and serial forms. The first module connection 604 can also be a scalable coherent interface (SCI). The SCI can be a processor-memory-IO bus.

The wireless communication module 606 is defined as a communication port for wirelessly communicating with a remote device. For example, the wireless communication module 606 can be a Bluetooth™ wireless protocol communication unit that can receive short range Bluetooth™ signals and convert it to a signal understandable by the control CPU 602. For example, the remote device can be an user interface 608. The user interface 608 is a user device for receiving and relaying user input. For example, the user interface 608 can be the user interface 502 of FIG. 5.

The control CPU 602 can also communicate with other modules or processor units through CAN buses 610. The CAN buses 610 can connect one or more of CAN transceivers with the control CPU 602. The CAN transceivers are devices comprising both a transmitter and a receiver which can communicate through the controller area network (CAN). For example, the control CPU 602 can be connected through a motor transceiver 612 to motor boards 614. For another example, the control CPU 602 can be connected through a sensor transceiver 616 to sensor boards 618.

The control CPU 602 can be connected through a second module connection 620 to a USB transceiver 622. The second module connection 620 can be the same type of connection as the first module connection 604. For example, the second module connection 620 can be a SCI bus. The USB transceiver 622 can be a universal serial bus (USB) port. The USB transceiver 622 can be used to receive external information from external devices, such as laptops, computers, media devices, tablets, smart phones, or any combination thereof. The USB transceiver 622 can also be used to send information off to external devices, such as printers, multi-functional peripherals, fax machines, external hard drives, or any combination thereof.

The control CPU 602 can be connected through a servo channel 624 to servos 626. The servo channel 624 is a wired channel to communicate with the servos 626. For example, the servo channel 624 can include pulse width modulated signal channels through one or more cables. The servos 626 are defined as automatic devices that can control mechanical positions through their movements. The servos 626 can use error-sensing negative feedback to correct the performance of a physical mechanism described in the present invention.

The control CPU 602 can be connected through a peripheral bus 628 to a variety of external devices. The peripheral bus 628 is defined as a bus for connecting with external devices. For example, the peripheral bus 628 can be a Serial Peripheral Interface Bus (SPI bus).

The control CPU 602 can be connected through the peripheral bus 628 to an external memory 630. For example, the external memory 630 can be an external secured digital (SD) card, SD Flash, memory stick flash, compact flash card, or any combination thereof. For example, the external memory 630 can be for storing gait history, movement settings, sensor data, gait profile, or any combination thereof.

The control CPU 602 can be connected through the peripheral bus 628 to an analog-to-digital converter 632. The analog-to-digital converter 632 can be used by the control CPU 602 to convert sensor output analog signals to digital signals. The control CPU 602 can also be connected through the peripheral bus 628 to a speaker 634. The speaker 634 can be used by the control CPU 602 to generate warning messages to the user of the exoskeleton. The control CPU 602 can also generate auditory messages regarding the operation of the exoskeleton via playback of recorded sound or via text to speech technology.

The control CPU 602 can be connected through a component bus 636 to a variety of components. The component bus 636 is defined as an inter-integrated circuit board bus. For example, the component bus 636 can be a I2C bus.

The control CPU 602 can be connected through the component bus 636 to a clock 638. The clock 638 is defined as a time-keeping component. For example, the clock 638 can be a real-time clock capable of synchronizing with other systems.

The control CPU 602 can be connected through the component bus 636 to a non-volatile memory 640. The non-volatile memory 640 is defined as a non-volatile memory component for storing data. For example, the non-volatile memory 640 can be a non-volatile random access memory for storing gait history, movement freedom settings, sensor data, gait profile, or any combination thereof.

The control CPU 602 can be connected through the component bus 636 to a temperature sensor 642. The temperature sensor 642 is defined as a sensor capable of measuring the degree of heat present in its environment. For example, the temperature sensor 642 can be a MAX6635MSA sensor.

The control CPU 602 can be connected through the component bus 636 to a gyroscope 644 and an accelerometer 646. The gyroscope 644 can maintain a specific orientation. The gyroscope 644 can also measure the changes in orientation. The accelerometer 646 can measure the degree of change in velocity or speed. The control CPU 602 can use the position information, orientation information, and acceleration information to determine the stability of the exoskeleton or the user, predict the intended movements of the user, whether the user is, for instance, sitting down, standing, walking, or crouching, or any combination thereof.

Figure 7:
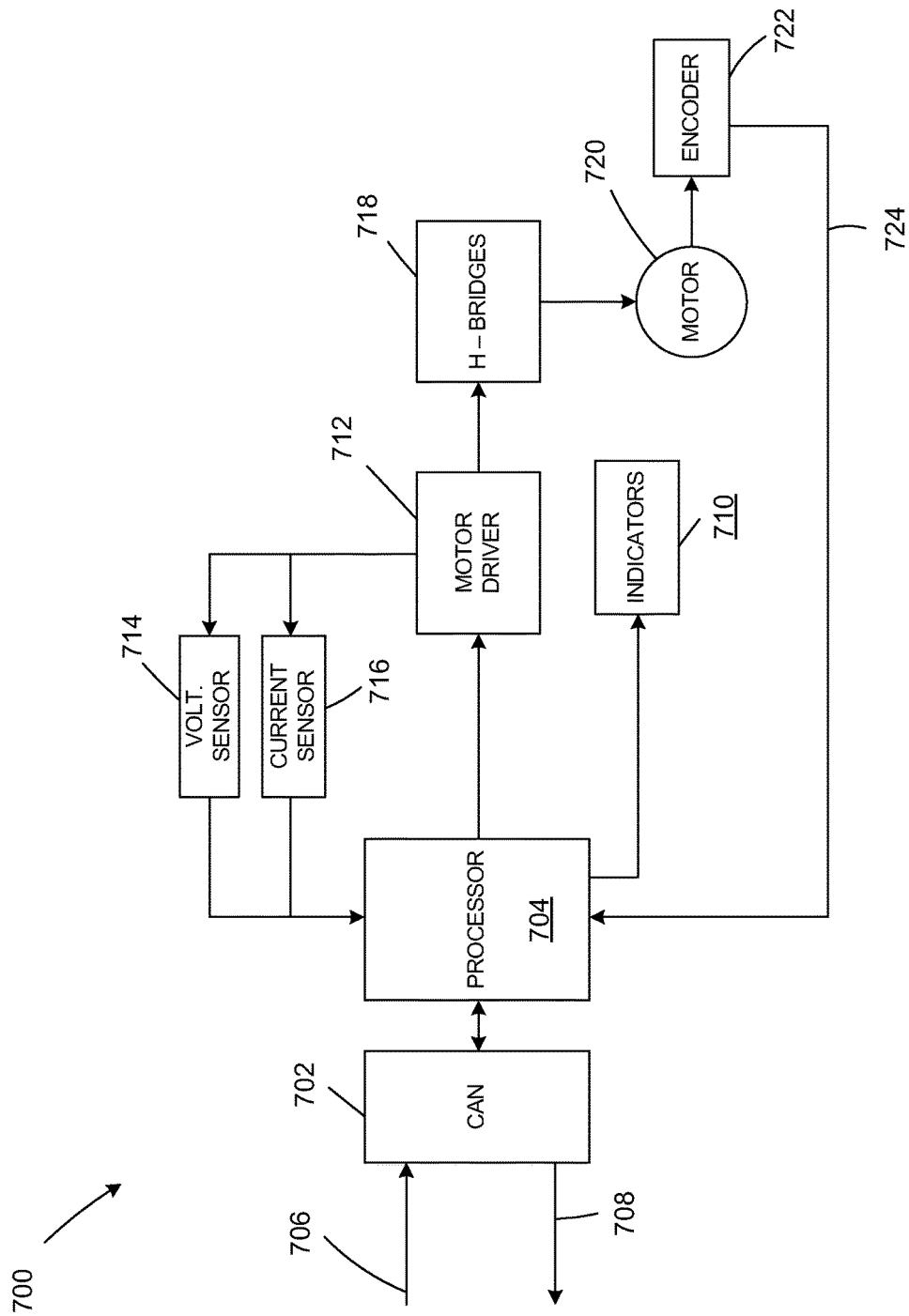
FIG. 7 is an example of a block diagram of a motor board.

Referring now to FIG. 7, therein is shown an example of a block diagram of a motor board 700. For example, the motor board 700 can be part of the control system 500 of FIG. 5. The motor board 700 is a circuit for controlling motors of actuator systems in the present invention.

The motor board 700 can communicate with other components of the invention via a controller network transceiver 702. The motor board 700 can include a processor 704 coupled to the controller area network transceiver 702. The processor 704 can receive an input message 706 via the controller area network transceiver 702 from a mainboard or a control system, such as the main board 600 of FIG. 6 or the control system 500 of FIG. 5. The processor 704 can send an output message 708 to the mainboard and the control system as well, such as information about the operation of the motors.

The motor board 700 can include indicators 710. The indicators 710 are defined as components for signaling to an operator the status of the motor board 700. For example, the indicators 710 can be colored or monochrome light emitting diodes (LEDs), colored lights, beepers, or any combination thereof.

The motor board 700 can include a motor driver 712. The motor driver 712 is defined as a piece of hardware for controlling a motor, such as the motor 530 of FIG. 5. The motor board 700 can also include a voltage sensor 714 and a current sensor 716. The voltage sensor 714 can measure the voltage applied to the motor and send it back to the processor 704. The current sensor 716 can measure the current drawn by the motor and send it back to the processor 704. The signals from the voltage sensor 714 and the current sensor 716 can be used as feedback to better control the speed and torque of the motors.

The motor board 700 can include a H bridge 718. The H bridge 718 is defined as an electronic circuit that enables a voltage to be applied across a load in different directions. The H bridge 718 can be used to allow direct current (DC) motors to run forwards and backwards. For example, the H bridge 718 can be used to run a motor 720 forward and backwards. The H bridge 718 can send a trapezoidal or a sinusoidal electric signal function to the motor 720 to drive it to rotate.

The motor 720 can be coupled to an encoder 722. The motor 720 can provide information for the encoder 722. The encoder 722 is defined as a transducer. For example, the encoder 722 can be the encoder 532 of FIG. 5. The encoder 722 can sense a position or an orientation of the motor 720 for reference or active feedback control. The encoder 722 can detect positional or orientation information from the motor 720 back to the processor 704 to provide the processor 704 with feedback information. For example, the encoder 722 can provide motor speed and direction through an encoder interface 724, such as a Quadrature Encoder Interface (QEI). The encoder interface 724 can provide the interface to incremental encoders for obtaining mechanical position data. Quadrature encoders can detect position and speed of rotating motion systems. The encoder 722 and the encoder interface 724 enable closed-loop control of motor control applications, such as Switched Reluctance (SR) and AC Induction Motor (ACIM).

Figure 8:
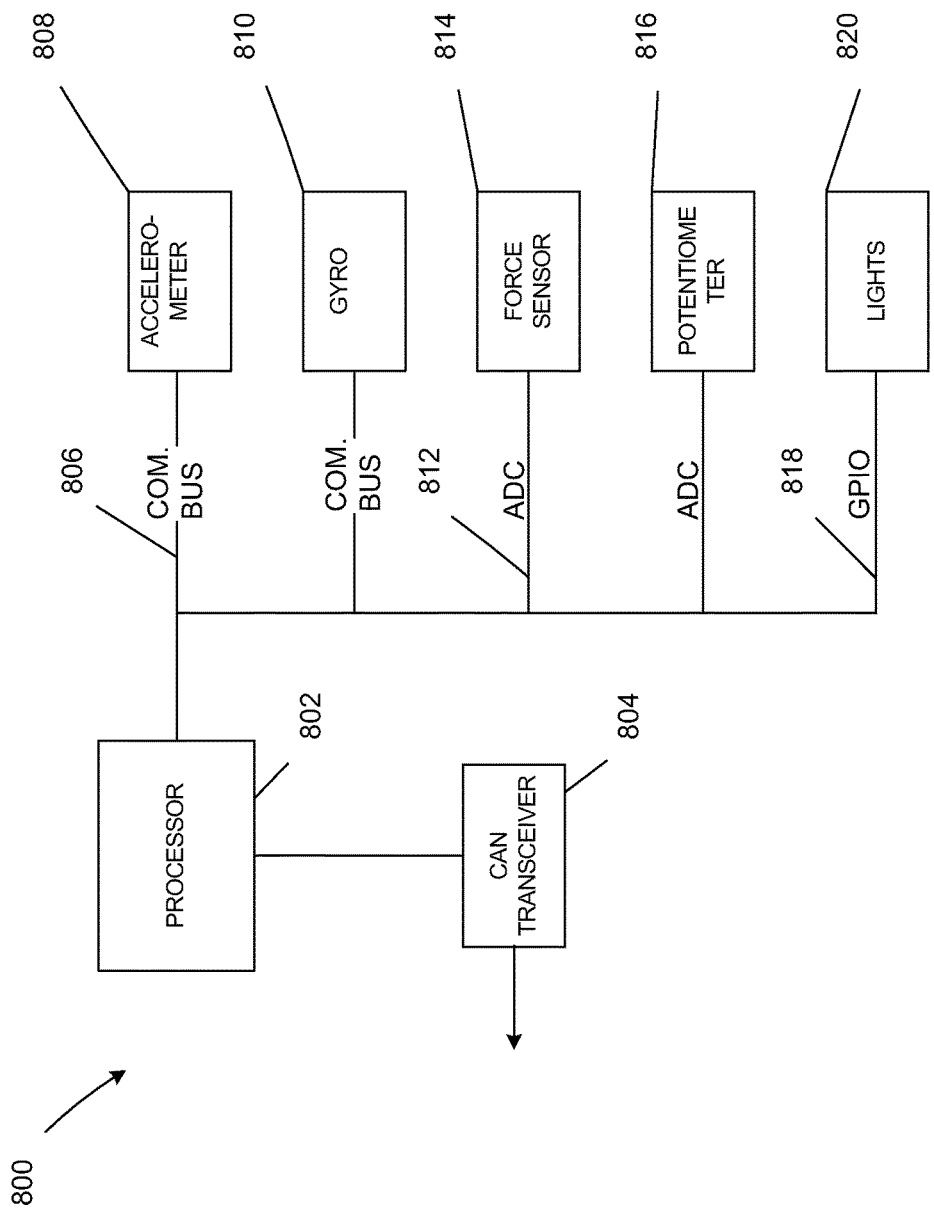
FIG. 8 is an example of a block diagram of a sensor board.

Referring now to FIG. 8, therein is shown an example of a block diagram of a sensor board 800. For example, the sensor board 800 can be part of the control system 500 of FIG. 5. The sensor board 800 is a circuit for controlling one or more sensors in the present invention.

The sensor board 800 can include a processor 802. The processor 802 can communicate with other components of the invention via a controller area network transceiver 804. For example, the controller area network transceiver 804 can output analog or digitized outputs of the one or more sensors connected to the sensor board 800. On board sensors can be connected to the processor 802 via a component bus 806. The component bus 806 is defined as an inter-integrated circuit board bus. For example, the component bus 806 can be an I2C bus.

The sensor board 800 can be connected to an accelerometer 808 via the component bus 806. The sensor board 800 can be connected to a gyro 810 via the component bus 806.

Figure 9:
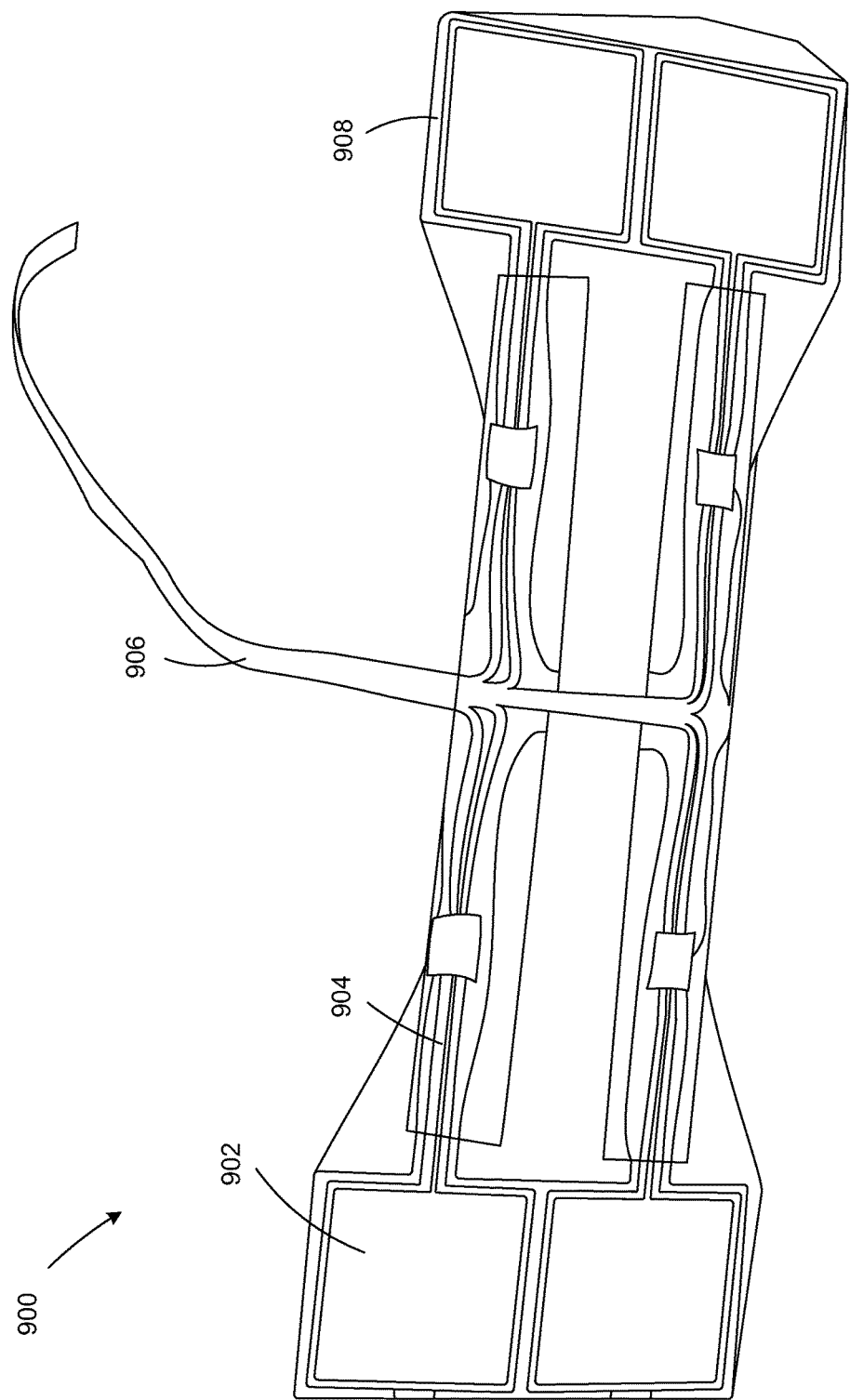
FIG. 9 is an example illustration of a sensor.

The sensor board 800 can be coupled to or include an analog-to-digital converter 812. Force sensors 814 can be connected to the processor 802 via the analog-to-digital converter 812. The analog-to-digital converter 812 can be an internal or external component of the sensor board 800, such as the analog-to-digital converter 632 of FIG. 6. The force sensors 814 are defined as sensors capable of detecting pressure forces. For example, the force sensors 814 can include force sensitive resistors. FIG. 9 illustrates an example of a package of the force sensors 814. The force sensors 814 can be used to sense force applied on feet, back and front thighs, back and front shins, or lower back of the user, or any combination thereof. These data then be used to trigger operations to support patients during therapy sessions.

A potentiometer 816 can also be connected to the processor 802 via the analog-to-digital converter 812. The same or different instance of the analog-to-digital converter 812 can be used for the potentiometer 816 and the force sensors 814. The potentiometer 816 is defined as a component that can act as an adjustable voltage divider. The potentiometer 816 can be used as a position sensor. The potentiometer 816 can also be used to adjust the sensitivity of the sensors connected to the processor 802. The potentiometers 816 can be used to sense hip, knee, and ankle angles. These angles can be used as feed-back data to correct and control operations in the control center 506 of FIG. 5.

The processor 802 can include a general purpose input/output (TO) 818. The general purpose TO 818 is defined as a generic pin on a chip such as the processor 802, whose behavior (including whether it is an input or output pin) can be controlled or programmed through software. The processor 802 can be programmed to output indication signal via lights 820. For example, the lights 820 can be single color LEDs.

Referring now to FIG. 9, therein is shown an example illustration of a sensor 900. For example, the sensor 900 can be a sensor in the sensor system 110 of FIG. 1 operated by the sensor board 800 of FIG. 8.

Sensors, such as the sensor 900, can be embedded in the textile both under and over the structural layer of the textile to determine forces acting upon the patient. The system can use force sensitive sensors placed on the anterior and posterior of the patient limbs both proximally and distally of the center point of each limb. The actuator system can apply force to the exoskeleton system which is then transferred to the patient body through the structural system and textile. By placing the sensors strategically between the structural textile and the body, these forces are measured to allow the system to determine how much force the system is placing on the body in order to allow the system to feed back into the control system. Additionally, sensors may be placed on the outside of the structural textile to determine the force differential between the forces applied by the exoskeleton and the forces applied externally by objects such as a chair in which the patient is seated in.

The sensor 900 can include a sensor plate 902. The sensor plate 902 can be a force sensitive resistor. For example, the sensor plate 902 can be made from a material whose resistance changes when a force or pressure is applied. Such material can include a conductive polymer sheet or a conductive ink applied on a conductive plate.

One or more of the sensor plate 902 can be connected via a sensor connector 904. The sensor connector 904 can be a cable, a wire, or other conductive path for propagating signal from the sensor plate 902. The sensor connector 904 can be bundled into a connection bundle 906. The connection bundle 906 can be a collection of the sensor connector 904 with a standardized connection to connect with an analog-to-digital converter or a sensor board. The entire body of the sensor 900 can be wrapped in a sensor wrap 908 to insulate and protect the sensor plate 902 and the sensor connector 904.

Figure 10:
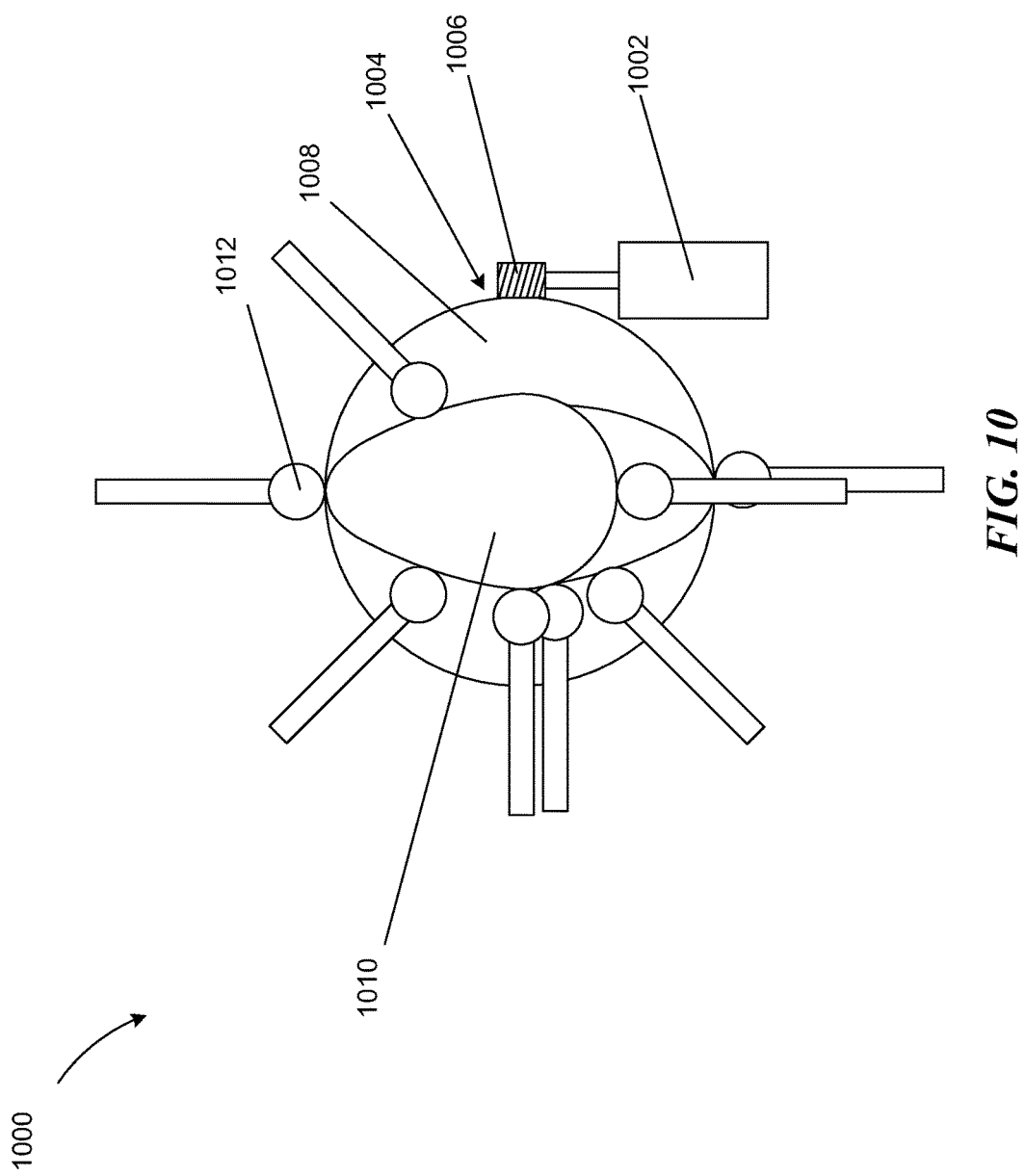
FIG. 10 is an example illustration of an actuation system in accordance with a further embodiment of the invention.

Referring now to FIG. 10, therein is shown an example illustration of an actuation system 1000 in accordance with a further embodiment of the invention. The actuation system 1000 is defined as a motor control system. For example, the actuation system 1000 can be the actuation system 106 of FIG. 1

In this embodiment, the actuation system 1000 uses a main drive motor 1002 and a main drive train 1004 including a worm 1006 and a worm gear 1008 to rotate a cam profile system 1010. The cam profile system 1010 can actuate linear cam followers 1012 to directly actuate pulley systems cables to rotate joints. The cams are designed specifically to actuate the knee angle and hip joints in the manner of a gait cycle and can be tuned to operate from standard walking gait or to mimic the specific gait style of a particular performance runner. The linear cam followers 1012 can be actuated by motors to vary the range of motion of the joints to allow deviation from standard gait.

The benefit of this embodiment is that the motor is nominally driven at a fixed speed for a gait of a specific cadence and the limbs of the user can be assisted in the designed gait of the particular cam profiles. The cam profiles can be tuned to lengthen or shorten stride, hip actuation, knee flexion at launch or other particular gait biomechanics which are deemed useful to improve gait. The device could be used both as a gait teaching device for users affected with disabilities as well as able bodied athletes simply desiring to learn or improve with a different running style or biomechanics.

Referring now to FIG. 11, therein is shown a flow chart of a method 1100 of operating an exoskeleton system, such as the exoskeleton system 100 of FIG. 1, in a further embodiment of the present invention. The method 1100 includes: receiving sensor information in a method step 1102; connecting a dual clutch system to a pulley system in a method step 1104; determining whether to engage a drive train gear to the dual clutch system based on the sensor information in a method step 1106; engaging the drive train gear through the dual clutch system when determined to engage the drive train gear in a method step 1108; and powering a first motor to drive the drive train gear for controlling a joint or segment of exoskeleton device in a method step 1110.

CLARIFICATION

The above description and drawings are illustrative and are not to be construed as limiting the invention to the precise forms disclosed. Persons skilled in the relevant art can appreciate that many modifications and variations are possible in light of the above disclosure. Numerous specific details are described to provide a thorough understanding of the disclosure. However, in certain instances, well-known or conventional details are not described in order to avoid obscuring the description. References to one or an embodiment in the present disclosure can be, but not necessarily are, references to the same embodiment; and such references mean at least one of the embodiments.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or any combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

While processes or blocks are presented in a given order, alternative embodiments may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed in parallel, or may be performed at different times. Further any specific numbers noted herein are only examples: alternative implementations may employ differing values or ranges.

The teachings of the disclosure provided herein can be applied to other systems, not necessarily the system described above. The elements and acts of the various embodiments described above can be combined to provide further embodiments.

Any patents and applications and other references noted above, including any that may be listed in accompanying filing papers, are incorporated herein by reference. Aspects of the disclosure can be modified, if necessary, to employ the systems, functions, and concepts of the various references described above to provide yet further embodiments of the disclosure.

These and other changes can be made to the disclosure in light of the above Detailed Description. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific embodiments disclosed in the specification, unless the above Detailed Description section explicitly defines such terms. Accordingly, the actual scope of the disclosure encompasses not only the disclosed embodiments, but also all equivalent ways of practicing or implementing the disclosure under the claims.

While certain aspects of the disclosure are presented below in certain claim forms, the inventors contemplate the various aspects of the disclosure in any number of claim forms. For example, while only one aspect of the disclosure is recited as a means-plus-function claim under 35 U.S.C. §112, 916, other aspects may likewise be embodied as a means-plus-function claim, or in other forms, such as being embodied in a computer-readable medium. (Any claims intended to be treated under 35 U.S.C. §112, 916 will begin with the words "means for".) Accordingly, the applicant reserves the right to add additional claims after filing the application to pursue such additional claim forms for other aspects of the disclosure.

The terms used in this specification generally have their ordinary meanings in the art, within the context of the disclosure, and in the specific context where each term is used. Certain terms that are used to describe the disclosure are discussed above, or elsewhere in the specification, to provide additional guidance to the practitioner regarding the description of the disclosure. For convenience, certain terms may be highlighted, for example using capitalization, italics and/or quotation marks. The use of highlighting has no influence on the scope and meaning of a term; the scope and meaning of a term is the same, in the same context, whether or not it is highlighted. It will be appreciated that same element can be described in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method of operating an exoskeleton device configured for gait assistance, the method comprising:
   connecting a bilateral structural frame that includes multiple joints to a pulley system using multiple cables;
   attaching the pulley system to a drive shaft that is connected to an actuation system,
      wherein the actuation system includes individual motors that are each responsible for controlling one of the multiple joints, and
      wherein the individual motors are arranged such that a main drive motor can independently actuate a pulley drive shaft corresponding to a particular individual motor and a particular joint;
   receiving feedback information from sensors that are embedded within the multiple joints of the bilateral structural frame and within a flexible textile that at least partially envelops the bilateral structural frame;

based on the feedback information, selectively engaging, by the actuation system, the particular individual motor to actuate the pulley drive shaft,
wherein engagement of the pulley drive shaft causes a tension to be applied to a particular cable connected to the particular joint of the bilateral structural frame, and
wherein the tension causes extension or flexion of the particular joint of the bilateral structural frame to be modified.

2. The method of claim 1, wherein the sensors include accelerometers, force-sensitive resistors, potentiometers, inertial measurement units, gyroscopes, biological sensors, or a combination thereof.

3. The method of claim 1, wherein the drive shaft and the actuation system are modularly attachable to the pulley system.

4. The method of claim 1, wherein the particular joint of the bilateral structural frame is substantially immovable prior to the tension being applied to the particular cable.

5. The method of claim 1, wherein each of the individual motors are connected to the actuation system via a clutch system.

6. The method of claim 5, wherein the clutch system uses servo-actuated pawls to independently engage and disengage pulley drive shafts connected to the individual motors.

7. A method of operating an exoskeleton device, the method comprising:
connecting a structural frame that includes multiple joints to a pulley system using multiple cables,
wherein the structural frame includes sensors that are embedded within the multiple joints or within a flexible textile that at least partially envelops the structural frame;
attaching the pulley system to a drive shaft that is connected to an actuation system,
wherein the actuation system includes individual drive train systems that are responsible for controlling the multiple joints, and
wherein the individual drive train systems are arranged such that a main drive train can independently actuate pulley drive shafts corresponding to particular joints of the structural frame;
continually receiving feedback information from the sensors;
determining, by a control system, whether to engage an individual drive train system by the actuation system based on the feedback information;
in response to determining the individual drive train system should be engaged, actuating a particular joint of the structural frame by
supplying power to a main drive motor that is connected to the main drive train,
causing the main drive train to selectively engage the individual drive train system,
causing a clutch system to engage the pulley drive shaft corresponding to the individual drive train system, and
causing the pulley drive shaft to apply a tension to a particular cable corresponding to the particular joint of the structural frame.

8. The method of claim 7, wherein the main drive motor is powered by a battery, a green energy source, an electric source, a hydraulic or pneumatic pressure system, or a combination thereof.

9. The method of claim 7, wherein an amount of power supplied to the main drive motor is based on the feedback information received from the sensors.

10. The method of claim 7, wherein the clutch system uses servo-actuated pawls to independently engage and disengage the pulley drive shaft of each individual drive train system.

11. The method of claim 7, wherein the clutch system is a dual-clutch system.

12. The method of claim 7, wherein the individual drive train system includes worm gears that have a non-backdriving feature.

* * * * *